(12) United States Patent
Satou et al.

(10) Patent No.: US 9,871,433 B2
(45) Date of Patent: Jan. 16, 2018

(54) LINEAR ACTUATOR AND TUBE ASSEMBLY METHOD FOR LINEAR ACTUATOR

(71) Applicant: KAYABA INDUSTRY CO., LTD., Tokyo (JP)

(72) Inventors: Kousuke Satou, Kanagawa (JP); Takashi Kakiuchi, Kanagawa (JP)

(73) Assignee: KYB Corporation, Tokyo (JP)

( * ) Notice: Subject to any disclaimer, the term of this patent is extended or adjusted under 35 U.S.C. 154(b) by 626 days.

(21) Appl. No.: 14/373,936

(22) PCT Filed: Jun. 5, 2013

(86) PCT No.: PCT/JP2013/065604
§ 371 (c)(1),
(2) Date: Jul. 23, 2014

(87) PCT Pub. No.: WO2014/002718
PCT Pub. Date: Jan. 3, 2014

(65) Prior Publication Data
US 2014/0361641 A1    Dec. 11, 2014

(30) Foreign Application Priority Data
Jun. 27, 2012  (JP) ................................ 2012-144000

(51) Int. Cl.
H02K 5/10         (2006.01)
H02K 41/02        (2006.01)
(Continued)

(52) U.S. Cl.
CPC ............. *H02K 41/02* (2013.01); *H02K 15/00* (2013.01); *H02K 41/031* (2013.01); *H02K 5/10* (2013.01);
(Continued)

(58) Field of Classification Search
CPC .......... F16F 15/03; H02K 41/02; H02K 15/00
(Continued)

(56) References Cited

U.S. PATENT DOCUMENTS 5,263,558 A * 11/1993 Yamaoka ........... B60G 17/0157
                                                  188/267
5,959,374 A *  9/1999 Anderson ............ H02K 41/031
                                                   310/13
(Continued)

FOREIGN PATENT DOCUMENTS

EP           0962043 A1    12/1999
JP       2000-078828 A      3/2000
(Continued)

*Primary Examiner* — Terrance Kenerly
(74) *Attorney, Agent, or Firm* — Rabin & Berdo, P.C.

(57) ABSTRACT

A linear actuator includes a first tube and a second tube inserted into the first tube to be free to slide. The first tube includes an outer tube and a cap provided detachably on an end portion of the outer tube, while the second tube includes a base portion and an inner tube provided detachably on the base portion and inserted into the outer tube to be free to slide. A first sliding member that slides against an outer periphery of the inner tube is provided on an inner periphery of one end of the outer tube. A second sliding member that slides against an inner periphery of the outer tube is provided on an outer periphery of an end portion of the inner tube corresponding to the other end of the outer tube.

5 Claims, 3 Drawing Sheets

(51) Int. Cl.
 *H02K 41/03* (2006.01)
 *H02K 15/00* (2006.01)
 *H02K 5/167* (2006.01)
 *H02K 7/08* (2006.01)

(52) U.S. Cl.
 CPC ............ *H02K 5/1672* (2013.01); *H02K 7/08* (2013.01); *Y10T 29/49009* (2015.01)

(58) Field of Classification Search
 USPC .......................................... 310/12.12, 12.01
 See application file for complete search history.

(56) References Cited

U.S. PATENT DOCUMENTS

| | | | | |
|---|---|---|---|---|
| 6,952,060 | B2* | 10/2005 | Goldner | B60G 17/0157 310/12.13 |
| 9,476,471 | B2* | 10/2016 | Bussiere | F16D 55/40 |
| 2005/0230201 | A1* | 10/2005 | Kondou | B60G 13/00 188/267 |
| 2013/0112104 | A1* | 5/2013 | Tamai | B61F 5/245 105/199.2 |
| 2013/0175886 | A1* | 7/2013 | Kakiuchi | H02K 41/031 310/12.18 |
| 2013/0175887 | A1 | 7/2013 | Kakiuchi et al. | |

FOREIGN PATENT DOCUMENTS

| | | | | |
|---|---|---|---|---|
| JP | 2001280417 | * | 10/2001 | ............ F16F 15/03 |
| JP | 2002-295580 A | | 10/2002 | |
| JP | 2003-324934 A | | 11/2003 | |
| JP | 2006-161881 A | | 6/2006 | |
| JP | 2007-274820 A | | 10/2007 | |
| JP | 2008-236832 A | | 10/2008 | |
| JP | 2012-070466 A | | 4/2012 | |
| WO | WO 2012-004945 A1 | | 1/2012 | |
| WO | WO2012035979 | * | 3/2012 | ............ H02K 41/031 |

* cited by examiner

LINEAR ACTUATOR AND TUBE ASSEMBLY METHOD FOR LINEAR ACTUATOR

TECHNICAL FIELD

The present invention relates to a linear actuator that expands and contracts in an axial direction, and a method of assembling tubes of the linear actuator.

BACKGROUND ART

JP2007-274820A discloses a linear actuator in which a first tube and a second tube undergo relative displacement in an axial direction on the basis of an electromagnetic force generated between permanent magnets provided on the first tube and coils provided on the second tube.

SUMMARY OF INVENTION

The linear actuator described in JP2007-274820A is configured such that a guide rod of the second tube is inserted into a center yoke of the first tube to be free to slide. A bearing (a sliding member) that slides against an outer periphery of the guide rod is provided on a tip end inner periphery of the center yoke, and a bearing (a sliding member) that slides against an inner periphery of the center yoke is provided on a tip end outer periphery of the guide rod.

In this type of linear actuator, when an attempt is made to insert to the guide rod into the center yoke in a condition where the bearings are attached to the center yoke and the guide rod, the bearing of the center yoke and the bearing of the guide rod interfere with each other such that the guide rod cannot be inserted into the center yoke, and therefore the first tube and the second tube cannot be assembled easily.

An object of the present invention is to provide a linear actuator and a method of assembling tubes thereof, with which a first tube and a second tube can be assembled easily.

An aspect of the present invention provides a linear actuator including a first tube and a second tube inserted into the first tube to be free to slide. The first tube includes an outer tube and a cap provided detachably on an end portion of the outer tube so as to close the end portion, while the second tube includes a base portion and an inner tube provided detachably on the base portion and inserted into the outer tube to be free to slide. A first sliding member that slides against an outer periphery of the inner tube is provided on an inner periphery of one end of the outer tube. A second sliding member that slides against an inner periphery of the outer tube is provided on an outer periphery of an end portion of the inner tube corresponding to the other end of the outer tube.

Embodiments and advantages of the present invention will be described in detail below with reference to the attached drawings.

DESCRIPTION OF EMBODIMENTS

Figure 1:
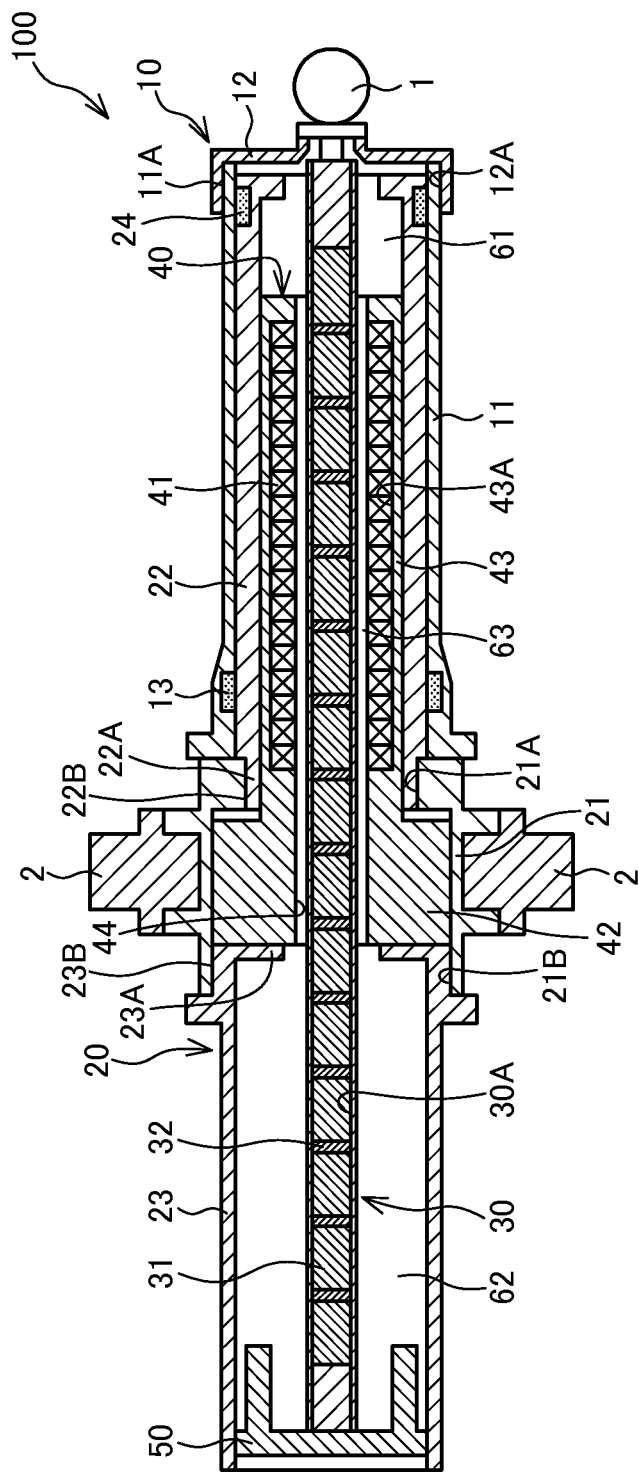
FIG. 1 is an axial direction sectional view showing a linear actuator according to an embodiment in a maximum contraction condition.
Figure 2:
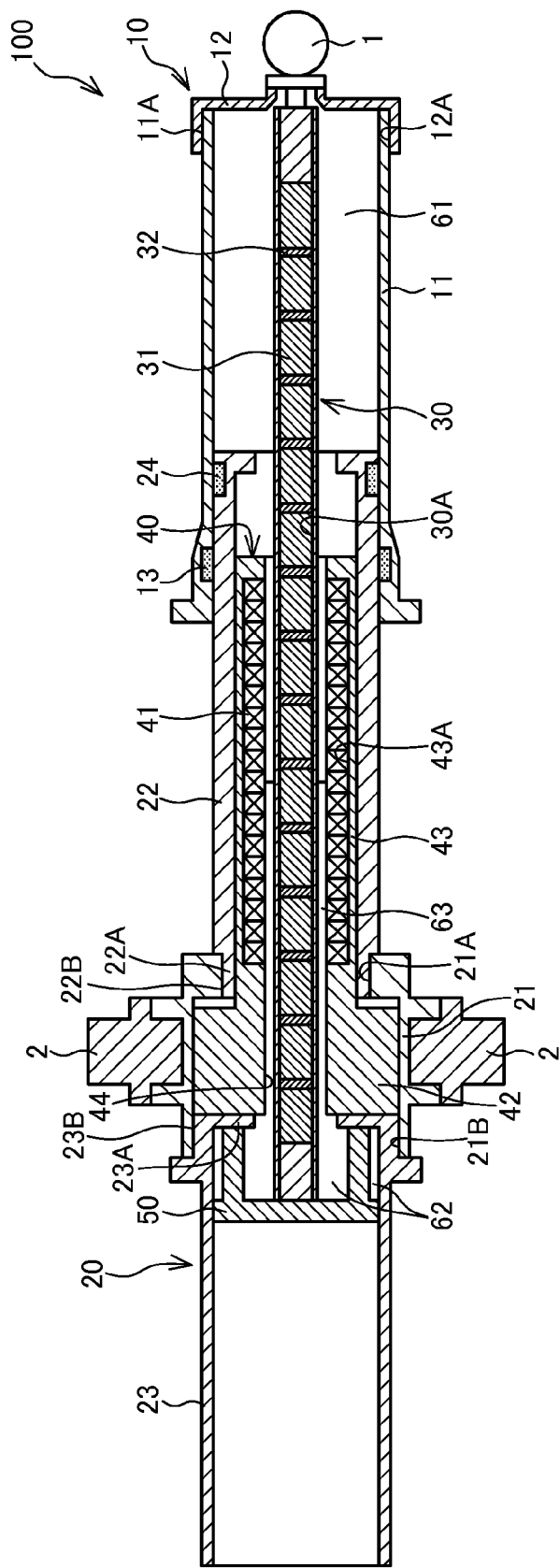
FIG. 2 is an axial direction sectional view showing the linear actuator according to the embodiment in a maximum expansion condition.

Referring to FIGS. 1 and 2, a linear actuator 100 according to an embodiment will be described.

The linear actuator 100 is used as a vibration damping actuator that suppresses vibration of an automobile, a railway vehicle, an architectural structure, or the like.

The linear actuator 100 includes a first tube 10, a second tube 20 inserted into the first tube 10 to be free to slide, a rod 30 that is fixed to an end portion of the first tube 10 and holds permanent magnets 31, and a coil holder 40 that is provided so as to be fitted into the second tube 20, and holds coils 41 that oppose the permanent magnets 31. The linear actuator 100 is disposed between two members that move relative to each other via a connecting portion 1 provided on the first tube 10 and a connecting shaft 2 provided on the second tube 20.

In the linear actuator 100, a thrust (an electromagnetic force) for driving the rod 30 in an axial direction is generated in accordance with a current flowing through the coils 41, and on the basis of this thrust, the first tube 10 and the second tube 20 are relatively displaced. As a result, the linear actuator 100 expands and contracts between a maximum contraction position shown in FIG. 1 and a maximum expansion position shown in FIG. 2.

The first tube 10 includes a cylindrical outer tube 11 open at both ends, and a cap 12 provided detachably on one end of the outer tube 11. The outer tube 11 and the cap 12 are joined by screwing together a screw portion 11A formed on an outer periphery of an end portion of the outer tube 11 and a screw portion 12A formed on an inner periphery of an end portion of the cap 12. Hence, one end of the first tube 10 is closed by the cap 12, while the other end of the first tube 10 is formed as an open end. The connecting portion 1 is fixed to an outside surface of the cap 12.

The second tube 20 includes a cylindrical base portion 21, an inner tube 22 provided detachably on one end side of the base portion 21, and a guide tube 23 provided detachably on the other end side of the base portion 21.

The base portion 21 is a cylindrical member open at both ends. A pair of the connecting shafts 2 is fixed to an outer periphery of the base portion 21 so as to project in a radial direction. The connecting shafts 2 are provided in positions deviating from each other by 180° in a circumferential direction. The second tube 20 is connected to one of the two relatively moving members via the connecting shafts 2, and the first tube 10 is connected to the other of the two relatively moving members via the connecting portion 1.

The inner tube 22 is a cylindrical member open at both ends. The inner tube 22 is provided in the outer tube 11 of the first tube 10 to be free to slide.

An end portion of the inner tube 22 on a side fixed to the base portion 21 is formed as a reduced diameter portion 22A having a smaller outer diameter than remaining parts. The inner tube 22 and the base portion 21 are joined by screwing together a screw portion 22B formed on an outer periphery of the reduced diameter portion 22A of the inner tube 22 and a screw portion 21A formed on an inner periphery of an end portion of the base portion 21.

A bearing (a second sliding member) 24 that slides against an inner periphery of the outer tube 11 is provided on an outer periphery of the free end of the inner tube 22. Further, a bearing (a first sliding member) 13 that slides against an outer periphery of the inner tube 22 is provided on an inner periphery of the open end of the outer tube 11 on an inner tube 22 insertion side. The bearings 13, 24 are annular slide metals. The outer tube 11 of the first tube 10 and the inner tube 22 of the second tube 20 slide smoothly via the bearings 13, 24.

It should be noted that a dust lip, not shown in the figures, is provided on the inner periphery of the outer tube 11 further toward the open end than the bearing 13 to prevent dust, dirt, and so on from entering the linear actuator 100. The dust lip of the outer tube 11 is also a sliding member that slides against the outer periphery of the inner tube 22.

The guide tube 23 is a cylindrical member open at both ends. The guide tube 23 and the base portion 21 are joined to each other by screwing together a screw portion 23B formed on an outer periphery of an end portion of the guide tube 23 and a screw portion 21B formed on an inner periphery of an end portion of the base portion 21. A rod guide 50 fixed to a tip end of the rod 30 is provided in the guide tube 23 to be free to slide.

The rod 30 is a rod-shaped member having a hollow portion 30A. One end of the rod 30 is fixed to the cap 12 constituting the end portion of the first tube 10. The aforementioned rod guide 50 is fixed to the other end of the rod 30. By providing the rod guide 50 on the tip end of the rod 30, a tip end part of the rod 30 can be prevented from swinging in the radial direction during expansion and contraction of the linear actuator 100.

A plurality of the permanent magnets 31 are held in the hollow portion 30A of the rod 30 so as to be arranged in the axial direction. The permanent magnet 31 is formed in a columnar shape and polarized such that an N pole and an S pole appear in the axial direction. Adjacent permanent magnets 31 are disposed such that identical poles oppose each other. Further, yokes 32 are provided between adjacent permanent magnets 31. It should be noted that the yokes 32 do not necessarily have to be provided, and the respective permanent magnets 31 may be disposed directly adjacent to each other.

The coil holder 40 is a tubular member provided to be fitted to the respective inner peripheries of the base portion 21 and the inner tube 22 of the second tube 20. An inner diameter of the base portion 21 is formed to be larger than an inner diameter of the inner tube 22, and therefore the coil holder 40 includes a large diameter portion 42 fitted to the inner periphery of the base portion 21 and a small diameter portion 43 fitted to the inner periphery of the inner tube 22.

Further, the coil holder 40 includes an insertion hole 44 through which the rod 30 is passed in the axial direction. An annular recessed portion 43A is formed in an inner peripheral surface of the small diameter portion 43 constituting the insertion hole 44, and a plurality of the coils 41 are fixed to the annular recessed portion 43A. The plurality of coils 41 are arranged in the axial direction so as to oppose the permanent magnets 31.

A first chamber 61 is defined in the linear actuator 100 as a space between one end of the coil holder 40 and the cap 12 of the first tube 10, and a second chamber 62 is defined in the linear actuator 100 as a space between the other end of the coil holder 40 and the rod guide 50 disposed in the guide tube 23. The first chamber 61 and the second chamber 62 communicate via the insertion hole 44 in the coil holder 40. In other words, the first chamber 61 and the second chamber 62 communicate through an annular gap 63 formed between an inner periphery of the coil holder 40 constituting the insertion hole 44 and an outer periphery of the rod 30.

A current conducted through the coils 41 is controlled by a controller disposed on the exterior of the linear actuator 100 or the like. The controller controls a magnitude and a direction of the current conducted through the coils 41 on the basis of information indicating relative positions of the coils 41 and the permanent magnets 31, which is detected by a position sensor not shown in the figures. As a result, the thrust generated by the linear actuator 100 and a thrust generation direction (an expansion/contraction direction) are adjusted.

The position sensor is a Hall element that generates a Hall voltage corresponding to a strength of a magnetic field, and is buried in the large diameter portion 42 of the coil holder 40.

In the linear actuator 100, when a current is conducted through the coils 41 in a predetermined direction, a thrust for driving the rod 30 in a rightward direction of FIG. 1 is generated. When the rod 30 is driven in the rightward direction, the outer tube 11 of the first tube 10 moves in the rightward direction while sliding relative to the inner tube 22 of the second tube 20, and as a result, the linear actuator 100 expands.

A projecting portion 23A that projects inwardly is formed on the fixed end of the guide tube 23, and when the linear actuator 100 expands to the maximum expansion position (see FIG. 2), the rod guide 50 impinges on a left side surface of the projecting portion 23A such that further movement of the rod 30 is restricted. The rod guide 50 thereby functions as a stopper.

When a current is conducted through the coils 41 in an opposite direction to that of the expansion operation, on the other hand, a thrust for driving the rod 30 in a leftward direction of FIG. 2 is generated. When the rod 30 is driven in the leftward direction, the outer tube 11 of the first tube 10 moves in the leftward direction while sliding relative to the inner tube 22 of the second tube 20, and as a result, the linear actuator 100 contracts.

When the linear actuator 100 contracts to the maximum contraction position (see FIG. 1), the open end of the outer tube 11 impinges on a right end portion of the base portion 21 such that further movement of the rod 30 is restricted. The open end of the outer tube 11 thereby functions as a stopper.

Figure 3:
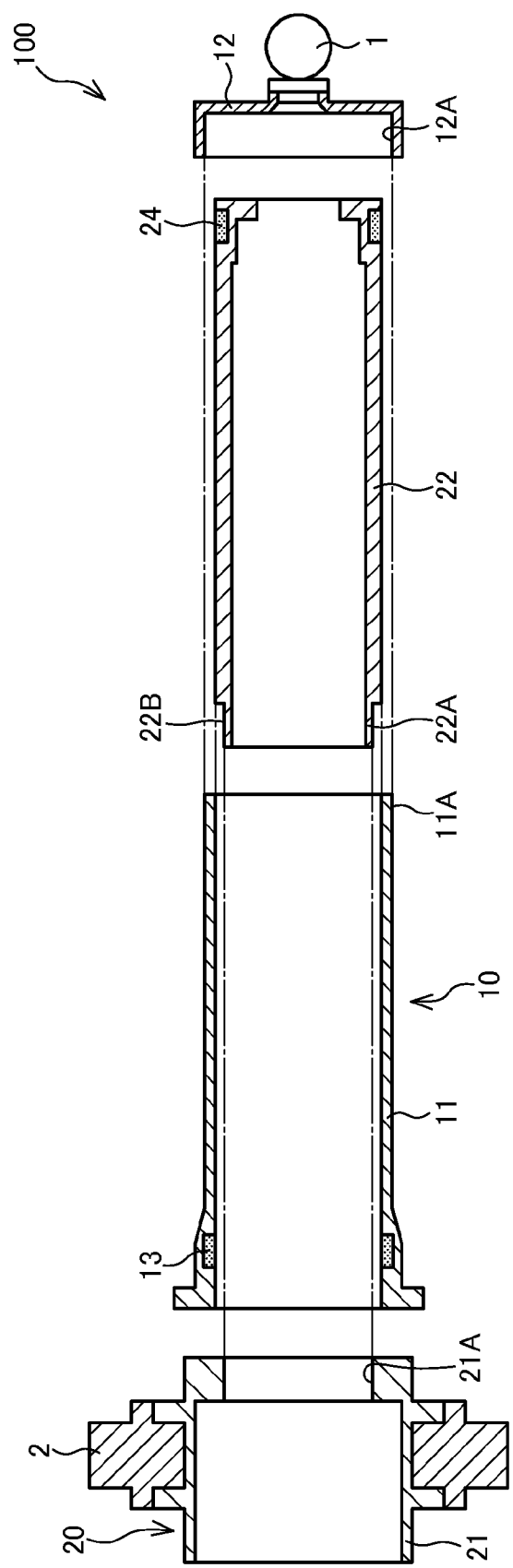
FIG. 3 is an exploded view showing a first tube and a second tube constituting the linear actuator, and illustrating a method of assembling the tubes.

Next, referring to FIG. 3, a method of assembling the first tube 10 and the second tube 20 of the linear actuator 100 will be described.

First, the bearing 13 is attached to the end portion inner periphery of the outer tube 11 on the opposite side to the end portion on which the cap 12 is provided (first sliding member attachment process), whereupon the bearing 24 is attached to the end portion outer periphery of the inner tube 22 on the opposite side to the end portion on which the reduced diameter portion 22A is formed (second sliding member attachment process).

Next, the end portion of the outer tube 11 on which the cap 12 is provided and the end portion of the inner tube 22 on which the reduced diameter portion 22A is formed are aligned, whereupon the inner tube 22 is inserted into the outer tube 11 (insertion process). By inserting the inner tube 22 in this manner, interference does not occur between the bearing 13 and the bearing 24 even when the inner tube 22 provided with the bearing 24 is inserted into the outer tube 11 provided with the bearing 13.

Next, the inner tube 22 is attached to the base portion 21 while inserted into the outer tube 11 (tube attachment process). By screwing the screw portion 22B on the reduced diameter portion 22A of the inner tube 22 to the screw portion 21A of the base portion 21, the inner tube 22 is joined to the base portion 21.

Next, the cap 12 is attached to the end portion of the outer tube 11 (cap attachment process). By screwing the screw portion 12A on the end portion inner periphery of the cap 12 to the screw portion 11A on the end portion outer periphery of the outer tube 11, the cap 12 is joined to the outer tube 11.

The coil holder 40 is then inserted so as to be fitted into the base portion 21 and the inner tube 22, whereupon the guide tube 23 is attached to the base portion 21.

In the linear actuator 100 according to this embodiment, the first tube 10 and the second tube 20 are assembled easily through the respective processes described above. The linear actuator 100 is then completed by attaching the rod 30 and the various other members.

In the assembly process described above, the cap 12 is attached to the outer tube 11 after attaching the inner tube 22 to the base portion 21, but the present invention is not limited thereto. Instead, for example, the cap 12 may be attached to the outer tube 11 after inserting the inner tube 22 into the outer tube 11, whereupon the inner tube 22 is attached to the base portion 21.

With the linear actuator 100 according to the embodiment described above, following effects can be obtained.

In the linear actuator 100, the cap 12 and the outer tube 11 provided with the bearing 13 are configured detachably. The base portion 21 and the inner tube 22 provided with the bearing 24 are likewise configured detachably. Hence, by inserting the end portion of the inner tube 22 on the opposite side to the end portion on which the bearing 24 is disposed from the end portion of the outer tube 11 on the opposite side to the end portion on which the bearing 13 is disposed, interference between the bearing 13 of the outer tube 11 and the bearing 24 of the inner tube 22 during the insertion process can be avoided. As a result, the first tube 10 and the second tube 20 can be assembled easily.

Further, the outer tube 11 and the cap 12 are joined by screwing together the screw portion 11A formed on the end portion outer periphery of the outer tube 11 and the screw portion 12A formed on the end portion inner periphery of the cap 12, while the inner tube 22 and the base portion 21 are joined by screwing together the screw portion 22B formed on the end portion outer periphery of the inner tube 22 and the screw portion 21A formed on the end portion inner periphery of the base portion 21. By providing a connecting part between the outer tube 11 and the cap 12 and a connecting part between the inner tube 22 and the base portion 21 with a comparatively simple configuration in this manner, attachment and detachment operations can be performed easily.

The first tube 10 and the second tube 20 of the linear actuator 100 are assembled by performing the first sliding member attachment process, the second sliding member attachment process, the insertion process, and the tube attachment process in sequence. The cap 12 is attached to the outer tube 11 either after the tube attachment process, or after the insertion process and before the tube attachment process. Regardless of the order in which the cap attachment process is performed, the first tube 10 and the second tube 20 can be assembled smoothly.

An embodiment of the present invention was described above, but the above embodiment merely illustrates a part of examples of applications of the present invention, and the technical scope of the present invention is not limited to the specific configurations described in the embodiment.

In the linear actuator 100, the plurality of permanent magnets 31 are arranged fixed within the hollow portion 30A of the rod 30 so as to be arranged in the axial direction, but a fixing position of the permanent magnets 31 is not limited thereto. For example, the plurality of permanent magnets 31 may be formed in a ring shape and fitted externally to the outer periphery of the rod 30 so as to be arranged fixedly in the axial direction.

The present application claims priority based on Japanese Patent Application No. 2012-144000, filed with the Japan Patent Office on Jun. 27, 2012, the entire contents of which are incorporated herein by reference.

The invention claimed is:

1. A linear actuator that expands and contracts in an axial direction, comprising:
    a first tube; and
    a second tube inserted into the first tube to be free to slide, wherein
    the first tube includes an outer tube having first and a second end portions, the first end portion of the outer tube having an inner periphery on which a first recess is formed, and a cap screwed to the second end portion of the outer tube so as to close the second end portion,
    the second tube includes a base portion, and an inner tube inserted into the outer tube to be free to slide, the inner tube having first and second end portions, the first end portion of the inner tube being screwed to the base portion, the second end portion having an outer periphery on which a second recess is formed,
    a first sliding member that slides against an outer periphery of the inner tube, the first sliding member being attached to the first recess, and
    a second sliding member that slides against an inner periphery of the outer tube, the second sliding member being attached to the second recess.

2. The linear actuator as defined in claim 1, further comprising a rod that is fixed to the cap and is driven in the axial direction.

3. A tube assembly method for assembling a first tube and a second tube of a linear actuator that expands and contracts in an axial direction, the first tube including an outer tube having first and second end portions, the first end portion of the outer tube having an inner periphery on which a first recess is formed, and a cap screwed to the second end portion of the outer tube, the second tube including an inner tube having first and second end portions, the second end portion of the inner tube having an outer periphery on which a second recess is formed, and a base portion screwed to the first end portion of the inner tube, the method comprising:
    attaching a first sliding member to the first recess so that the first sliding member slides against an outer periphery of the inner tube;
    attaching a second sliding member to the second recess so that the second sliding member slides against an inner periphery of the outer tube;
    aligning the second end portion of the outer tube with the first end portion of the inner tube, and inserting the inner tube into the outer tube to be free to slide; and
    screwing the first end portion of the inner tube, which is inserted into the outer tube, to the base portion.

4. The tube assembly method as defined in claim 3, further comprising screwing the cap to the second end portion of the outer tube so as to close the second end portion, following the screwing the first end portion of the inner tube to the base portion.

5. The tube assembly method as defined in claim 3, further comprising screwing the cap to the second end portion of the outer tube so as to close the second end portion, after the inserting the inner tube into the outer tube and before the screwing the first end portion of the inner tube to the base portion.

* * * * *